(12) United States Patent
Dischler (10) Patent No.: US 6,539,987 B1
(45) Date of Patent: *Apr. 1, 2003

(54) METHOD OF PRESSURE PROCESSING ENCLOSURES HAVING BI-STABLE VALVES

(76) Inventor: Louis Dischler, 252 W. Park Dr. Duncan Park, Spartanburg, SC (US) 29306-5013

( * ) Notice: Subject to any disclaimer, the term of this patent is extended or adjusted under 35 U.S.C. 154(b) by 0 days.

This patent is subject to a terminal disclaimer.

(21) Appl. No.: 10/037,509
(22) Filed: Jan. 4, 2002

Related U.S. Application Data (63) Continuation-in-part of application No. 09/635,943, filed on Aug. 10, 2000, now Pat. No. 6,345,649.

(51) Int. Cl.[7] ................................................ B65B 1/04
(52) U.S. Cl. ........................ 141/4; 141/20.5; 141/301; 401/221; 137/859; 92/90
(58) Field of Search ............................. 141/2, 18, 20.5, 141/301, 285, 286, 4, 67; 137/859; 251/331; 92/90, 92, 98 R (56) References Cited

U.S. PATENT DOCUMENTS

| | | |
|---|---|---|
| 3,079,946 A | 3/1963 | Rosler |
| 4,587,999 A | 5/1986 | Boiko et al. |
| 4,712,583 A | 12/1987 | Pelmulder et al. |
| 5,738,459 A | 4/1998 | Smith |
| 5,771,935 A | 6/1998 | Myers |

*Primary Examiner*—Steven O. Douglas (57) ABSTRACT

The present disclosure provides a method of pressurizing enclosures having bi-stable valves. The valve has an invertible element having a port therethrough, and is converted from an open mode into a closed mode by a sudden change of pressure across the valve. The method is particularly suited for pressurization of enclosures en masse.

25 Claims, 6 Drawing Sheets

METHOD OF PRESSURE PROCESSING ENCLOSURES HAVING BI-STABLE VALVES

This application is a continuation-in-part of U.S. application Ser. No. 09/635,943, entitled "Bi-Stable Valve Especially Useful for Pressurizing Pen Refills" filed in the U.S. Patent and Trademark Office on Aug. 10, 2000 now U.S. Pat. No. 6,345,649. All cited applications/patents are incorporated by reference in their entirety for all purposes.

FIELD OF THE INVENTION

The present invention generally relates to a method of pressure processing enclosures having bi-stable valves. More specifically, the present invention relates to a method of pressurizing or depressurizing enclosures singly, or preferably en masse, where each enclosure comprises a bi-stable valve having open and closed modes, wherein a sudden change of external pressure causes the valves to close, generally irreversibly.

BACKGROUND OF THE INVENTION

Writing instruments such as pens are commonly provided with a cartridge or a refill such that, when the ink within the pen or refill is fully depleted, only the refill requires replacement. As a result, a variety of decorative pen housings can be provided to receive a standard refill so that the housing can be used repeatedly, requiring replacement of the refill only.

Refills may be pressurized, whereby a smooth and continuous flow of ink is produced regardless of the orientation of the pen itself. For a disposable product, it is preferable that the refill be supplied to the end user pressurized, without subsequent repressurization being necessary.

Pressurization may be achieved by providing chemicals within the refill that react over time, creating gas reaction products that maintain the pressure of the sealed refill tube. This is relatively complicated, expensive and imprecise.

Another method of pressurizing a refill involves pushing a stopper into the open proximal end of the ink tube, whereby the air between the end of the ink column and the stopper is compressed. With this method, the amount of ink that may be loaded into the ink tube is limited, because a portion of the volume, which is needed to compress the column of air, is lost as storage space for the ink.

Yet another method of introducing gas into a refill employs a valve pressed into the proximal end of the ink tube. For example, in the minimal configuration the valve employs one seal (U.S. Pat. No. 4,587,999 to Boiko, et al.), or three or more in a more complex configuration (U.S. Pat. No. 5,738,459 to Smith). Such valves necessarily must have low sealing forces, as the small size of the valve limits the size of springs or other elements employed to close the valve. Imperfections or contaminants on the sealing surfaces may thereby result in loss of pressurization.

A need, therefore, exists for an inexpensive and reliable valve capable of generating high sealing forces that also provides for self-actuated closure.

SUMMARY OF THE INVENTION

The present invention provides an initially open valve assembly having an inlet (proximal end) and an outlet (distal end) and a bi-stable element therebetween that closes the valve upon sudden reduction of inlet pressure. In a preferred embodiment, the valve assembly is used in a pen refill. In a second embodiment, the valve is used in a reversed orientation, so that a sudden increase of inlet pressure closes the valve.

The bi-stable element has an open mode, whereby fluid, particularly gaseous fluid, is allowed to flow therethrough, and a closed mode wherein fluid flow therethrough is blocked. The bi-stable element is preferably a curved disk molded in the closed mode shape from an elastomeric or polymeric material. The disk may also comprise a thin metallic layer or foil to prevent gaseous diffusion therethrough. The valve assembly may be pressed into the proximal end of the tubular ink reservoir of a refill (or other enclosure), with the valve in the initially open mode. Once the enclosure is pressurized, inlet pressure may be rapidly reduced, causing the disk to become unstable and invert. The force generated by the inversion of the disk is used to assist the closure of the valve. If the inlet pressure is reduced at a rate less than that required for inversion of the disk, pressure within the enclosure drops. External pressure may therefore be reduced slowly to scavenge the initial gases present within the reservoir, e.g. oxygen. One or more pressure cycles may be used.

If the valve orientation is reversed, the external pressure may be first dropped, allowing the enclosure to at least partially evacuate, and then rapidly increased to actuate the valve, thereby resulting in a rigid enclosure that contains a lower than atmospheric pressure, or a flexible enclosure having reduced free-space (with or without reduced internal pressure in the final configuration) due to compression of enclosure walls by the atmosphere. Such a flexible enclosure may be used to contain oxygen sensitive materials such as seeds, coffee, or alternatively may be used to minimize packing volume. Likewise, rigid enclosures may be evacuated for storage of foodstuffs or other materials.

For use with an enclosure such as an ink pen cartridge or refill, the valve assembly comprises at least one distal port and at least one proximal port. An inner support serves to enhance the sealing of an annular ring seal against the inner surface of ink reservoir, to carry the at least one proximal (inlet) port, and, optionally, a sealing plug or other element for sealing the at least one distal port. (The terms distal and proximal are interchanged for the reversed orientation of the valve.) The bi-stable element comprises means for closing the valve, and generally also comprises at least one distal (outlet) port allowing fluid communication with the body of the refill enclosure. The bi-stable element preferably comprises a curved disk, which may have varying thickness, and which may optionally have a thickened central area (boss) for enhancing the sealing of a proximal port penetrating the disk at that point. The disk may optionally carry a plug or other means for sealing the proximal port. The periphery of the disk, forming a continuous seal to the annular ring, is preferably reduced in thickness to allow for inversion of the disk. It is preferred that, given a flow rate, the pressure drop across the proximal port is greater than that across the distal port, so that the bi-stable element may be quickly actuated with minimal loss of enclosure pressure.

In general, in the preferred inventive method, one or more enclosures having open valves are placed into a chamber providing an external gaseous environment to the enclosures at a first pressure. The pressure within the chamber is then changed to a second pressure different from the first pressure, with the pressure within the enclosures tending to approach this second pressure. The chamber pressure is then changed to a third pressure different from the second pressure at a rate sufficient to close the valves, and the enclosures are then removed from the chamber. Prior to closure, the chamber may be pressurized (cycled) to other pressures between the first and second and/or second and third pressures, at a rate insufficient to close the valves.

It is an object of the present invention, therefore, to provide method of pressurizing a plurality of enclosures having bi-stable valve elements.

It is an object of at least one embodiment of the present invention to provide a method of pressurizing a plurality of enclosures having bi-stable valve elements, whereby gas initially present within the enclosure may be scavenged by cycling the pressure external to the enclosure.

It is another object of at least one embodiment of the invention to provide a method of pressurizing ink pens, whereby a bi-stable valve is automatically closed upon the reduction of pressure external to the pens.

It is an object of at least one embodiment of the present invention to provide a method of processing a plurality of enclosures having bi-stable valves, whereby the final pressure therein is less than atmospheric.

It is an object of at least one embodiment of the present invention to provide a method of processing a plurality of flexible enclosures having bi-stable valves, whereby the free volumes of the enclosures are reduced.

BRIEF DESCRIPTION OF THE DRAWINGS

The above as well as other objects of the invention will become more apparent from the following detailed description of the preferred embodiments of the invention, when taken together with the accompanying drawings in which.

DETAILED DESCRIPTION OF THE PRESENTLY PREFERRED EMBODIMENTS

Figures 1, 2, 3:
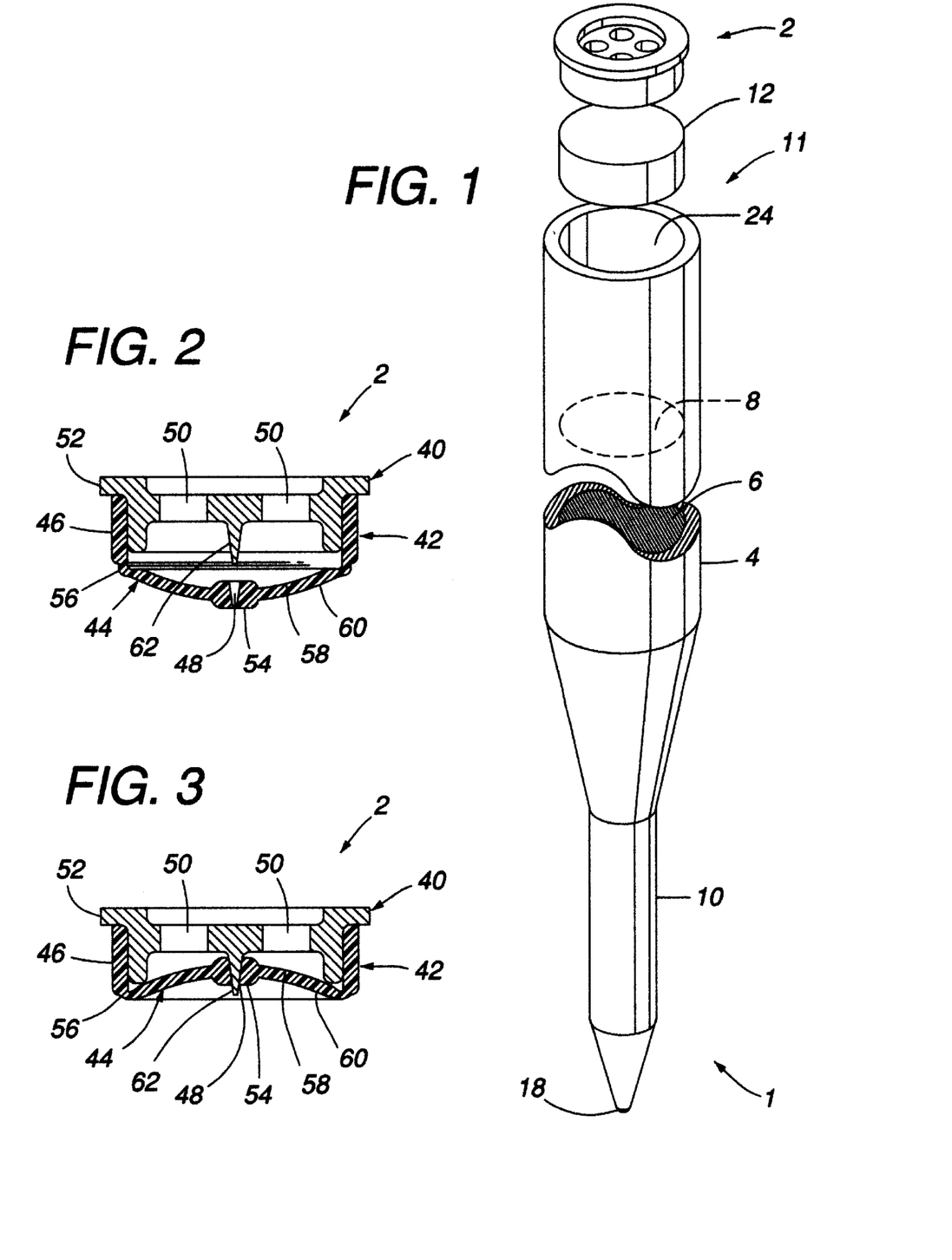
FIG. 1 is an exploded perspective view of a pen refill according to one embodiment of the invention.
FIG. 2 is a cross-sectional view of a valve assembly according to one embodiment of the invention, wherein the valve is in the open mode.
FIG. 3 is a cross-sectional view of the valve shown in FIG. 2, wherein the valve is in the closed mode.

Referring now to the drawings wherein like numerals refer to like parts, FIG. 1 illustrates a refill 1 having an interior volume defined by a tube 4 partially filled with ink 6 having an upper surface 8, whereupon the upper surface 8 may optionally comprise a follower and/or grease plug (not shown). The tube 4 is substantially and uniformly cylindrical along its length and tapers toward its distal end 10, where it terminates in a writing tip 18, such as a ballpoint. At the proximal end 11 of the tube 4 is an opening 24 through which a valve assembly 2 can be inserted. Below the valve assembly is an optional grease plug 12. The volume between the optional grease plug 12 and the upper surface 8 is filled with a pressurized gas. The gas is pressurized to maintain a constant and continuous pressure on the upper surface 8 such that the ink 6 evenly and continuously flows through the writing tip 18 when the refill 1 is used, for example, within a pen housing (not shown).

Figure 4:
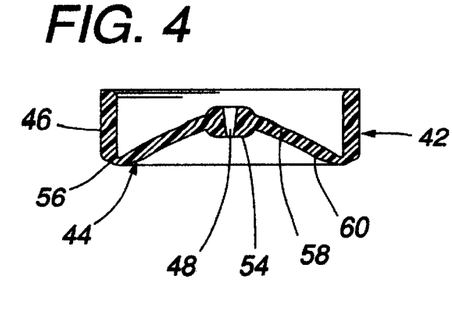
FIG. 4 is a cross-sectional view of a bi-stable element as shown in FIG. 3.

A preferred embodiment of the valve assembly 2 is shown in FIG. 2 in the open stable mode, and in FIG. 3 in the closed stable mode. The assembly comprises inner support 40 and bi-stable element 42. The inner support 40 comprises ports 50, plug 62, and lip 52. Bi-stable element 42 comprises annular ring 46, annular neck 56, curved disk 44, and boss 54. A tapered port 48 is located in boss 54. In FIG. 2, gas (and/or liquid, if desired) enters ports 50, and then enters tube 4 (not shown) by way of tapered port 48. If the supply gas pressure feeding ports 50 is suddenly dropped to a level sufficiently below that within the pressurized tube 4 (FIG. 1), then the curved disk 44 inverts. When inverted, the upper surface 58, shown as concave in FIG. 2, becomes convex in the closed mode shown in FIG. 3. Similarly, the lower surface 60, shown as convex in FIG. 2, becomes concave in the closed mode. If, as preferred, the bi-stable element is molded in a substantially closed configuration (shown in FIGS. 3 and 4), then the energy recovered in snapping from the open stable mode (FIG. 2) to the closed stable mode (FIG. 3) accelerates the boss 54, forcing the plug 62 into the tapered port 48 with a force which adds to that of the force generated by the differential gas pressure across the curved disk 44. If the bi-stable element 42 is molded in the open position, the snap action will still exist, however the force generated will be less.

Figure 5:
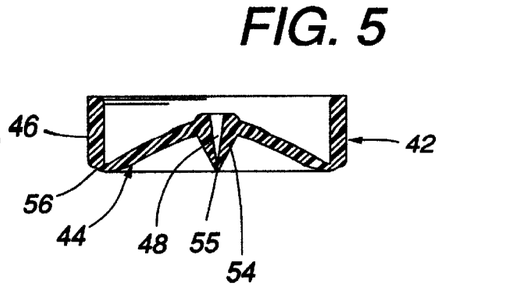
FIG. 5 is a cross-sectional view of a bi-stable element according to another embodiment of the invention, wherein the element is in the closed mode.

Turning now to FIG. 5, the tapered port 48 is shown in an alternative embodiment to taper to essentially zero diameter. This may be achieved if the boss is comprised of a resilient material (elastomer or rubber), and the lower part of the tapered port 48 is completed by piercing, so that no material is removed. This pierced port section 55 acts as a check valve during the short period of inversion of the disk 44, so that the pressure loss during inversion is minimized.

Figure 6:
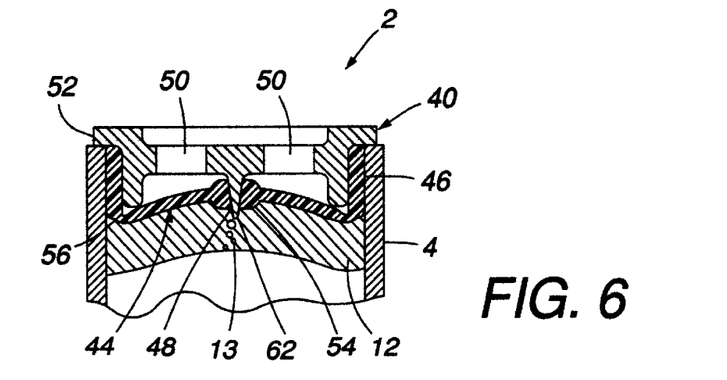
FIG. 6 is a cross-sectional view of a valve assembly and grease plug contained within the proximal end of a pen refill according to one embodiment of the invention, wherein the valve is in the closed mode.

If a grease plug 12, as shown in FIG. 6, is installed directly below boss 54, gas can be expected to channel through plug 12, with the gas channel 13 breaking up during the acceleration brought about by inversion of the bi-stable element 44, so that there is no direct passageway for gas to escape back through port 48. The grease plug serves essentially the same purpose in all of the embodiments of the invention, and further can serve to improve the sealing of annular ring 46 to the internal diameter of tube 4.

Figure 7:
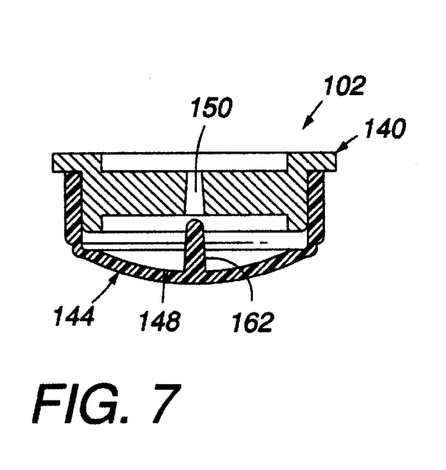
FIG. 7 is a cross-sectional view of a valve assembly in the open mode, according to another embodiment of the invention, wherein the bi-stable element carries a plug.
Figure 8:
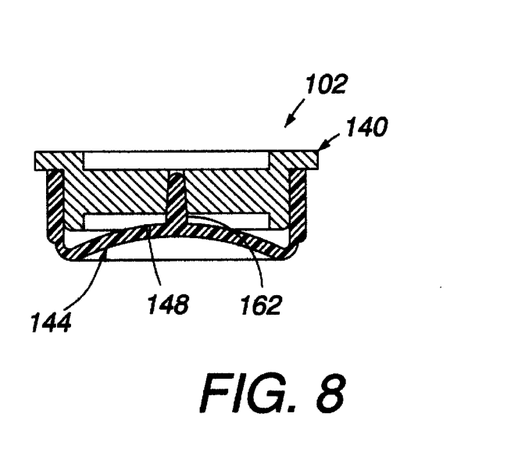
FIG. 8 is a cross-sectional view of a valve assembly as shown in FIG. 7, wherein the valve is in the closed mode.

Turning now to FIGS. 7 and 8, an alternative embodiment of the valve assembly 102 is shown in the open and closed modes, respectively. The curved disk 144 caries sealing plug 162 on its upper surface. Sealing plug seals proximal port 150 in inner support 140, when in the closed mode. A smaller distal port 148 is penetrates curved disk 144. The presence of plug 162 in proximal port 150 provides a visual indication that the valve is in the closed position.

Figure 9:
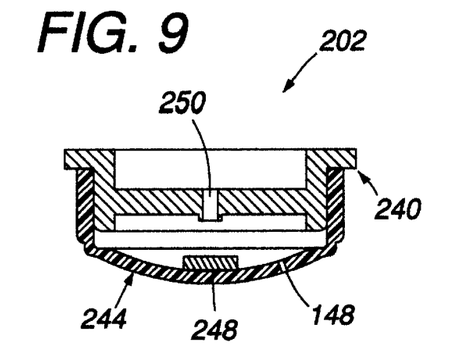
FIG. 9 is a cross-sectional view of a valve assembly in the open mode, according to another embodiment of the invention, wherein a resilient pad is substituted for a plug.

In FIG. 9, an alternative embodiment of the valve assembly 202 is shown in the open mode, wherein sealing of the proximal port 250 in inner support 240 is effected by pressure contact with resilient cushion 248, when the curved disk 244, penetrated by the smaller distal port 148, is inverted.

Figure 10:
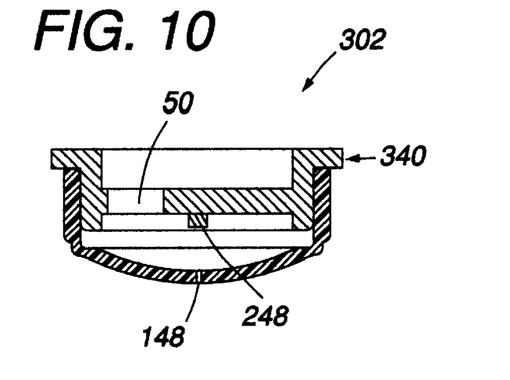
FIG. 10 is a cross-sectional view of a valve assembly in the open mode, according to yet another embodiment of the invention, wherein a resilient pad is substituted for a plug.

In FIG. 10, another alternative embodiment of the valve assembly 302 is shown in the open mode, wherein sealing of the smaller distal port 148 is accomplished by pressure contact with resilient cushion 248 attached to the lower surface of inner support 340.

Figure 11A:
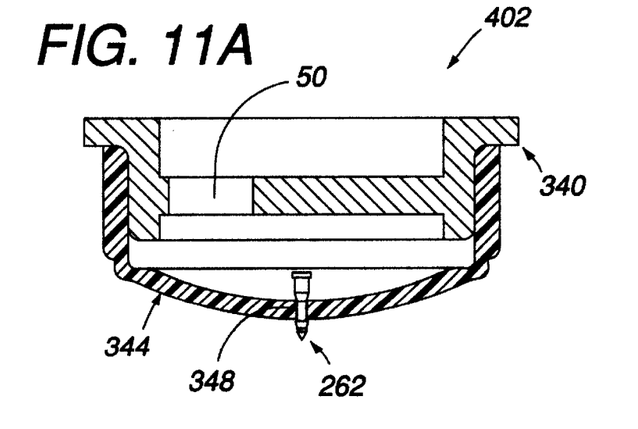
FIG. 11A is a cross-sectional view of a valve assembly in the open mode, according to another embodiment of the invention, comprising a projectile plug for sealing.
Figure 11B:
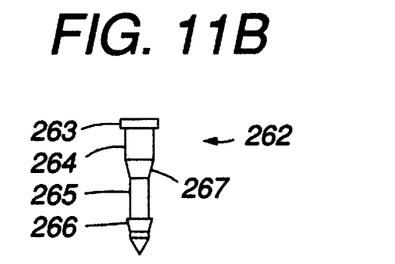
FIG. 11B is an enlarged side view of a projectile plug for sealing, as shown in FIG. 11A.

Sealing by way of a projectile plug 262 is shown in FIG. 11A, wherein the valve assembly 402 is in the open mode. The plug 262, enlarged in FIG. 11B, is shown to comprise a barbed tip 266 for loose retention of the plug in the open mode, a narrow diameter 265 to allow passage of gas in the open mode, a taper 267, a larger sealing diameter 264, and a head 263. When the curved disk 344 (FIG. 11A) inverts, the head impacts the lower surface of inner support 340, driving the plug into the distal port 348 so that the larger sealing diameter 264, larger than the distal port 348 diameter, seals off the pressure contained within the refill.

Figure 11C:
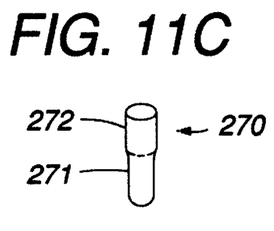
FIG. 11C is a perspective view of an alternative projectile plug for use in the valve assembly shown in FIG. 11A.

In FIG. 11C, an alternative projectile plug 270 is shown, comprising larger sealing diameter 272, and flattened section 271, where the flattened section allows retention by the distal port 348 (FIG. 11A) while also allowing gas blow-by in the open mode.

Figure 12:
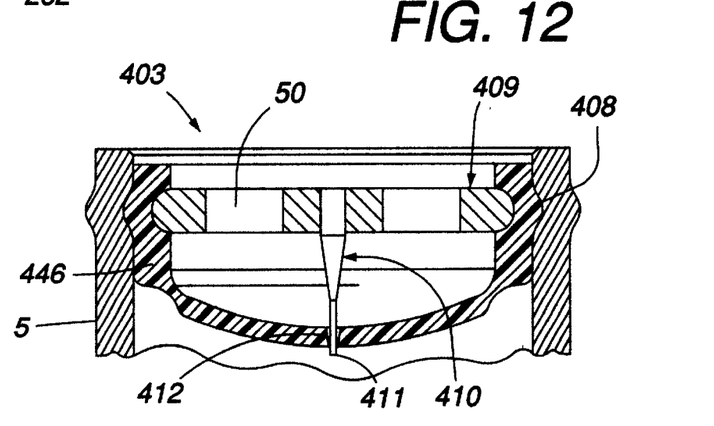
FIG. 12 is a cross-sectional view of a valve assembly in the open mode, according to another embodiment of the invention, wherein the valve is retained by a groove in the refill tube.

In FIG. 12, an embodiment is shown wherein a groove 408 in the internal diameter of the refill tube 5 serves to retain the annular ring 446 of the bi-stable assembly 403. The inner support 409 comprises a disk having proximal ports 50, and a separate partially tapered plug 410 mounted on its lower surface. The plug has a guide extension 411 to insure that the distal port 412 is properly oriented to the plug. Said extension may be used with any of the embodiments.

Figure 13A:
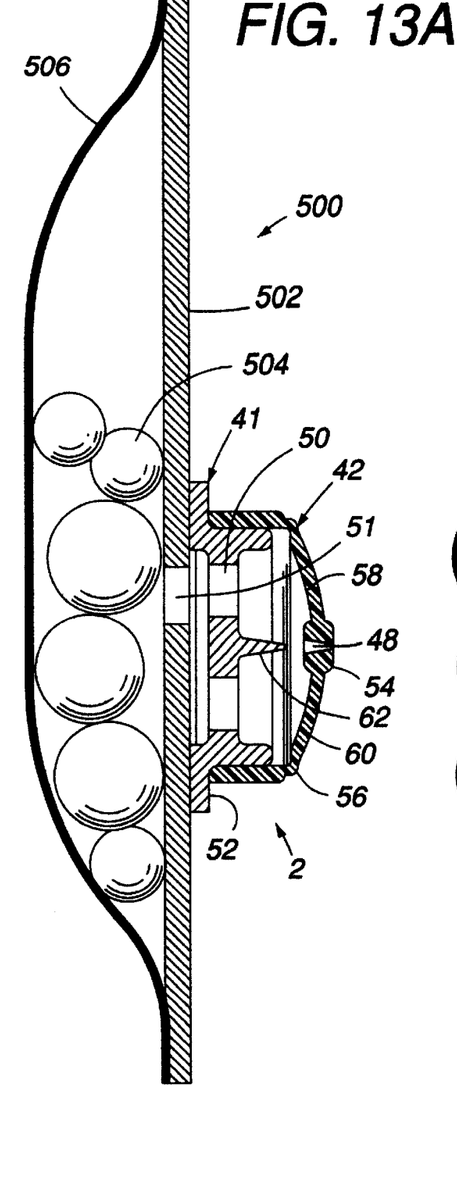
FIG. 13A is a cross-sectional view of a valve assembly in the open mode, according to another embodiment of the invention, wherein the valve is fitted to a flexible enclosure.
Figure 13B:
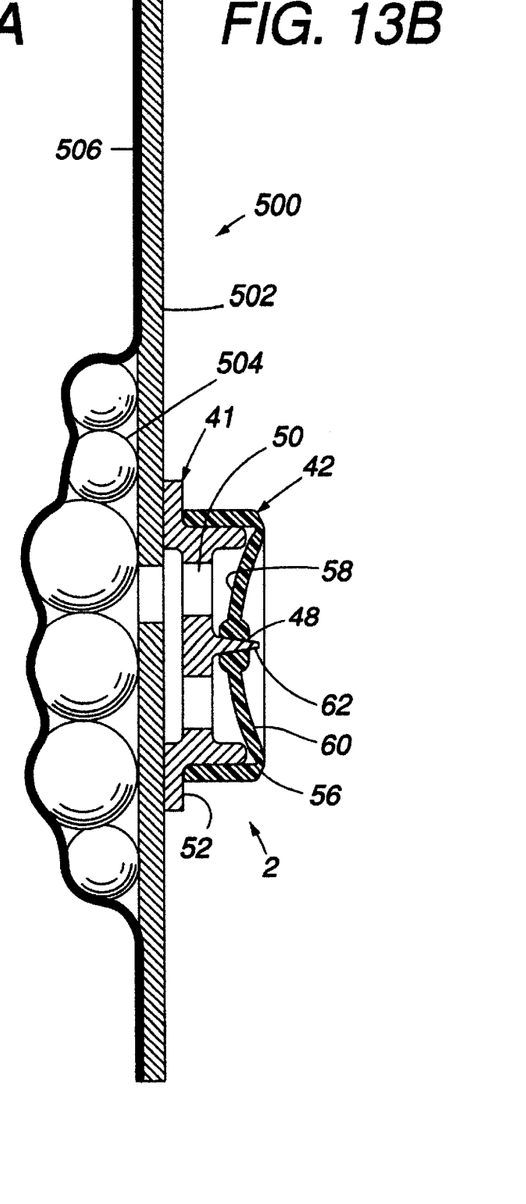
FIG. 13B is a cross-sectional view of a valve in the closed mode, according to the embodiment shown in FIG. 13A, wherein the valve is fitted to a flexible enclosure.

Turning now to FIGS. 13A, 13B, open and closed modes of an alternative embodiment comprising an enclosure generally indicated by numeral 500 is shown wherein the orientation of the valve assembly 2 to the external environment is reversed. The valve assembly 2 comprises inner support 40 and bi-stable element 42. The base 41 comprises ports 50, plug 62, and lip 52 that is bonded to layer 502 of the enclosure 500. In the open mode, port 51 allows fluid communication between the cavity formed between layer 502 and the flexible layer 506, with port 50 and with tapered port 48, and thence to the external environment. According to an embodiment of the inventive method, the enclosure 500 is placed in a chamber and the chamber is depressurized, allowing gas to bleed from the enclosure 500. The chamber is then re-pressurized at a rate sufficient to invert curved disk 44, whereby the upper surface 58, shown as concave in the open mode shown in FIG. 13A, becomes convex in the closed mode shown in FIG. 13B. The contents 504 of enclosure 500 are thereby compressed therein in a reduced pressure/volume environment. Lip 52 may be adhesively bonded or welded to layer 502, or may be continuous and integral with layer 502. Layer 502 may also be flexible. For layers 502 and 506, polymeric films or metal foils are preferred. The films or foils may be composite, comprising a number of layers, and may also comprise gas and/or moisture barrier layers that may be chosen from the non-limiting exemplary list of polyvinylidene, nylon, EVOH, polyester, and aluminum.

Figure 14A:
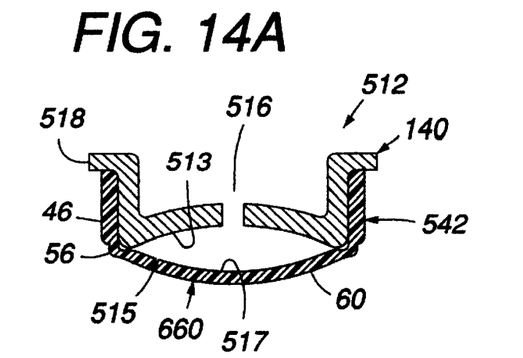
FIG. 14A is a cross-sectional view of a valve in the open mode, according to an alternative embodiment of the invention.
Figure 14B:
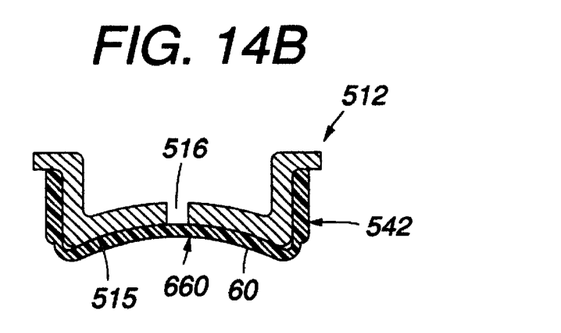
FIG. 14B is a cross-sectional view of a valve shown in FIG. 14A, in the closed mode.

Turning now to FIGS. 14A, 14B, open and closed modes are shown of an alternative embodiment of a valve assembly that is generally indicated by numeral 512. The assembly 512 comprises inner support 518 and bi-stable element 542. The inner support 518 comprises port 516 and lip 518. Bi-stable element 542 comprises annular ring 46, annular neck, 56, and invertible curved disk 660. A port 515 is misaligned with port 516. An adhesive coating on surface 517 and/or facing surface 513 completely surrounds port 516, and seals port 516 when invertible curved disk 660 is inverted into the closed mode shown in FIG. 14B. Valve 512 may be pressed into a tube (e.g. an ink pen) as shown in FIG. 1, or lip 518 may bonded to or integral with a layer as shown in FIG. 13A in either the orientation shown, or reversed therefrom, as required for producing a negative or positive relative pressure within the enclosure.

Figure 15A:
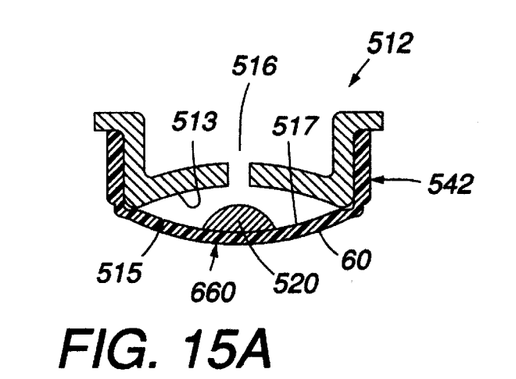
FIG. 15A is a cross-sectional view of a valve in the open mode, according to an alternative embodiment of the invention.
Figure 15B:
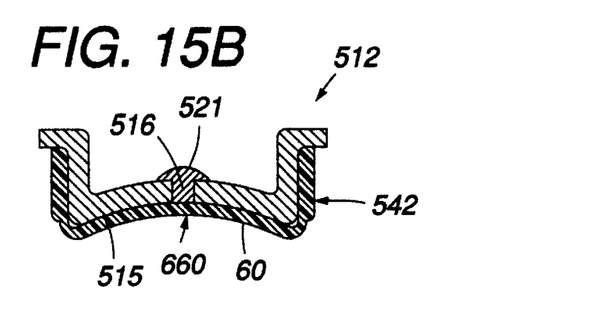
FIG. 15B is a cross-sectional view of a valve shown in FIG. 15A, in the closed mode.

In FIGS. 15A, 15B, open and closed modes of an alternative embodiment of valve assembly 512 are shown. The adhesive coating of surfaces 517 and/or 513 is replaced with adhesive plug 520, which deforms into seal 521 in FIG. 15B, completely blocking port 516 in the closed mode.

Figure 16:
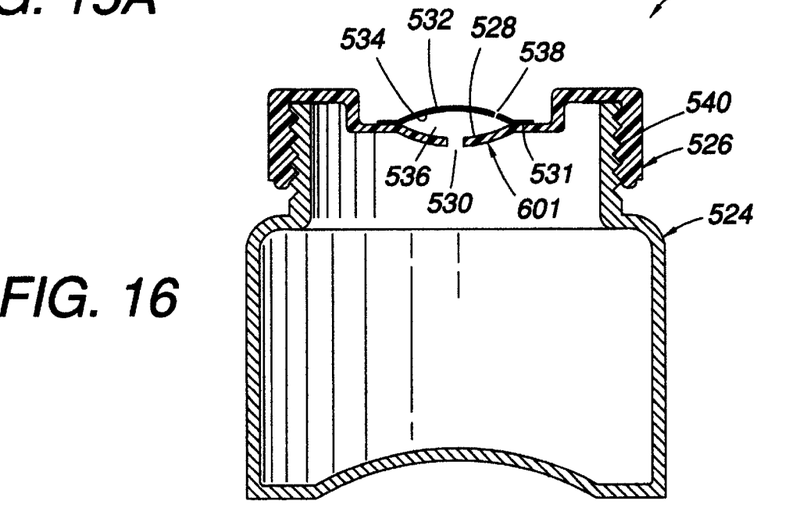
FIG. 16 is a cross-sectional view of an enclosure comprising a valve in the open mode, according to an alternative embodiment of the invention.

Turning now to FIG. 16, an alternative embodiment of a valve assembly is shown that is integral with a cap closure 526 of a cap/bottle enclosure generally indicated by numeral 522. Rigid bottle 524 is joined to cap closure 526 by threads 540. The valve assembly comprises invertible portion 532 having lower concave surface 534 and port 538. Non-inverting portion 601, integral with cap closure 526, comprises upper concave surface 528 sealed to invertible portion 532 by circumferential seal 531 to form cavity 536, port 530 misaligned with port 538, and an adhesive coating on surface 534 and/or surface 528, whereby port 530 and/or port 538 are blocked when invertible portion 532 inverts so that surface 534 contacts facing surface 528. Alternatively, an adhesive plug or tapered plug may used, as previously discussed. Also, the valve may be integral to the closure cap 526 (as shown), or bonded to it. According to the inventive method, enclosure 522 is placed into a pressure chamber (alone, or preferably with other enclosures), the chamber pressure is lowered so that a vacuum or partial vacuum is created within the enclosure, and the chamber is then repressurized at a rate sufficient to invert invertible portion 532 and close the valve. If the position of the valve is reversed, so that the invertible portion 532 lies within the enclosure 522, the enclosure may be pressurized to a value above atmospheric. In this embodiment of the inventive method, enclosure 522 is placed into a pressure chamber, the chamber pressure is raised (generally to a pressure higher than the final pressure desired within the enclosure 522) and the chamber pressure is dropped at a rate sufficient to invert portion 532, thereby closing the valve and trapping excess pressure within the enclosure 522. Several cycles of pressurization/depressurization may be performed at a rate insufficient to close the valve prior to final closure in order to scavenge unwanted gases from the enclosure 522. The working gas pressurizing the chamber may be steam, carbon dioxide, nitrogen, air, argon, or other suitable gas, and may be condensable or non-condensable.

Figure 17A:
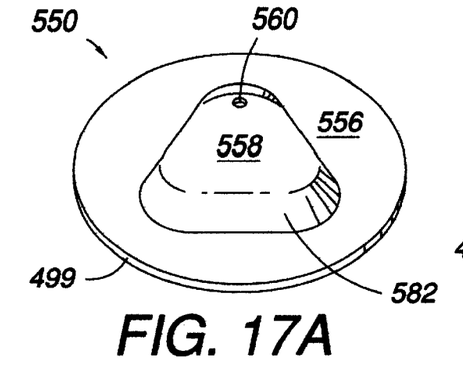
FIG. 17A is a perspective view of a non-circular invertible portion for a valve according to an alternative embodiment of the invention.
Figure 17B:
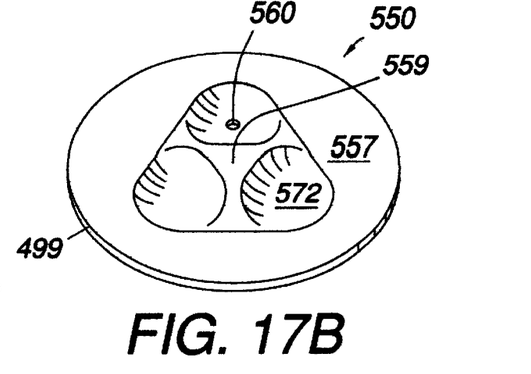
FIG. 17B is a perspective view of the non-circular invertible portion shown in FIG. 17A, wherein the portion is pre-inverted.
Figure 18:
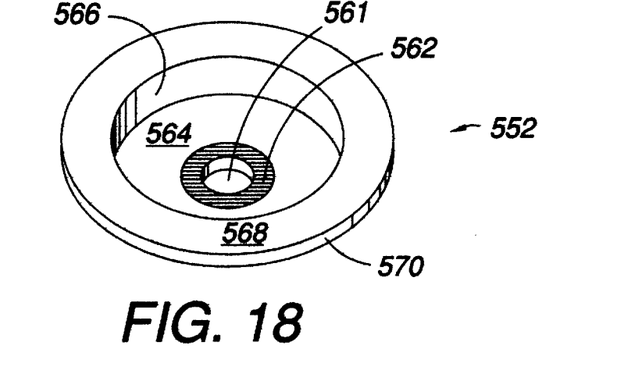
FIG. 18 is a perspective view of a non-inverting portion for a valve according to an alternative embodiment of the invention.
Figure 19A:
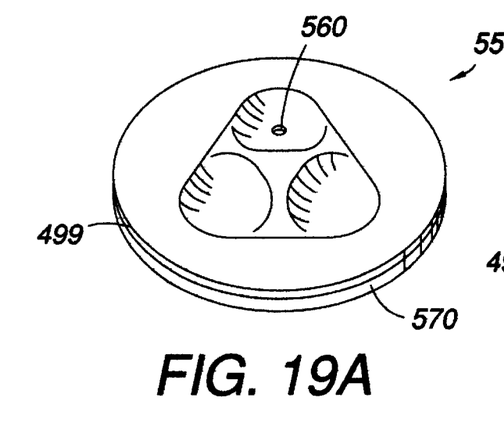
FIG. 19A is a perspective view of a valve according to an alternative embodiment of the invention, shown in the open mode.
Figure 19B:
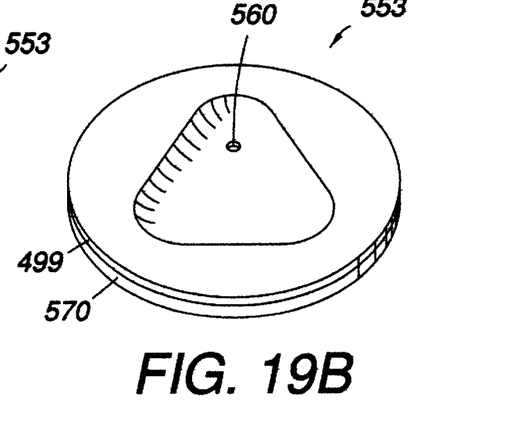
FIG. 19B is a perspective view of a valve of FIG. 19A, shown in the closed mode.

In FIG. 17A, a non-circular invertible portion 550 for a valve according to the instant invention is shown. The invertible portion 550 comprises a flange 499 from which projects a tri-lobal peripheral wall 582 and sealing surface 558 comprising port 560. When pre-inverted and turned over, the appearance of portion 550 is shown in FIG. 17B, with three depressions 572 and central raised surface 559. In FIG. 18, a mating lower (non-inverting) portion 552 is shown. Portion 552 has flange 570, wall 566, and sealing surface 564 having an adhesive coating 562 surrounding port 561, which is misaligned with port 560 when portion 552 is sealingly bonded with portion 550 along flange surfaces 556 and 568 as shown in FIG. 19A as valve 553. Inversion of the preinverted portion produces the closed mode of valve 553 as shown in FIG. 19B. Alternatively, an adhesive or tapered plug may be used instead of or in addition to adhesive layer 562, and the adhesive may be applied to either the invertible portion 550 or to the non-inverting portion 552, so long as at least port 560 and/or port 561 are blocked in the closed mode. Also, the invertible portion need not be pre-inverted, i.e., the valve may be assembled with the invertible portion as shown in FIG. 17A with flange surface 557 sealed to flange surface 568, rather than as shown in FIG. 17B, and may be of any shape, so long as it is invertible and functions to close the valve when inverted.

While enclosures may be pressurized individually, it is preferred for process economy and for uniformity of pressurization that they be pressurized en masse by placing a plurality of the enclosures in a pressure chamber, pressurizing the chamber with a gas to a pressure higher than required (to allow for loss through the distal port during inversion of the bi-stable element, and for the increase in internal pressurized refill volume brought about by the inversion), allowing the gas pressure to build up in the enclosures, and then depressurizing the chamber pressure at a rate sufficient to invert the bi-stable elements within the enclosures, followed by removal of the enclosures from the chamber. Alternatively, the pressure may first be dropped, to evacuate the enclosures, and then pressurized as above. One or more pressurizing/depressurizing cycles may be performed at a rate insufficient to close the valves prior to a final and more rapid pressure drop whereby the valves are closed. For enclosures fitted with reversed valves, the terms "pressurizing" and "depressurizing" are interchanged.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

I claim:

1. A method of altering the pressure within an enclosure, comprising the steps of:
    (a) providing the enclosure, wherein the enclosure comprises a passageway by which the enclosure is in fluid communication with a gaseous external environment, wherein said passageway comprises a valve, wherein said valve comprises a bi-stable invertible element comprising a first port therein, and wherein said bi-stable invertible element comprises an open mode wherein said first port allows fluid passage therethrough, and a closed mode wherein said first port is blocked and fluid communication therethrough is prevented;
    (b) placing the enclosure into a chamber providing said gaseous external environment at a first pressure with said bi-stable invertible element in said open mode;
    (c) changing said gaseous external environment of step "b" to a second pressure, wherein said second pressure is different from said first pressure;
    (d) changing said gaseous external environment of step "c" to a third pressure different from said second pressure at a rate sufficient to convert said bi-stable invertible element from said open mode to said closed mode, whereby said passageway is blocked; and
    (e) removing the enclosure from said chamber.

2. A method of altering the pressure within an enclosure, as recited in claim 1, wherein said second pressure is greater than said first pressure and said third pressure.

3. A method of altering the pressure within an enclosure, as recited in claim 1, wherein said second pressure is less than said first pressure and said third pressure.

4. A method of altering the pressure within an enclosure, as recited in claim 1, wherein said enclosure comprises a tube.

5. A method of altering the pressure within an enclosure, as recited in claim 4, wherein said tube comprises ink.

6. A method of altering the pressure within an enclosure, as recited in claim 5, wherein a plurality of substantially identical enclosures is provided in step "a", and said enclosures are processed simultaneously in steps "b" through "d".

7. A method of altering the pressure within an enclosure, as recited in claim 5, wherein said second pressure is greater than said first pressure and said third pressure.

8. A method of altering the pressure within an enclosure, as recited in claim 1, wherein the enclosure comprises a flexible wall portion.

9. A method of altering the pressure within an enclosure, as recited in claim 8, wherein said flexible wall portion comprises a film.

10. A method of altering the pressure within an enclosure, as recited in claim 8, wherein said second pressure is less than said first pressure and said third pressure.

11. A method of altering the pressure within an enclosure, as recited in claim 1, wherein the enclosure comprises a cap closure, and wherein said cap closure comprises said valve.

12. A method of altering the pressure within an enclosure, as recited in claim 11, wherein the enclosure is rigid.

13. A method of altering the pressure within an enclosure, as recited in claim 11, wherein a plurality of substantially identical enclosures is provided in step "a", and said enclosures are processed simultaneously in steps "b" through "d".

14. A method of altering the pressure within an enclosure, as recited in claim 1, wherein said bi-stable invertible element is a curved disk.

15. A method of altering the pressure within an enclosure, as recited in claim 1, wherein said first port is blocked in said closed mode by a plug.

16. A method of altering the pressure within an enclosure, as recited in claim 15, wherein said plug penetrates said first port in said closed mode.

17. A method of altering the pressure within an enclosure, as recited in claim 16, wherein said plug comprises a compliant pad.

18. A method of altering the pressure within an enclosure, as recited in claim 1,
   wherein said valve further comprises a substrate surface comprising a concave depression therein;
   wherein said concave depression comprises a second port therein;
   wherein said bi-stable invertible element comprises a film;
   wherein said film forms a convex blister in said open mode; and
   wherein said film forms a concave blister in contact with said concave depression in said closed mode, whereby said second port is blocked.

19. A method of altering the pressure within an enclosure, as recited in claim 18, wherein said film and/or said substrate surface comprise an adhesive coating, whereby said second port is sealed in said closed mode.

20. A method of altering the pressure within an enclosure, as recited in claim 19, wherein said adhesive coating bonds said convex blister to said concave depression in a circumferential seal, wherein said first port comprises a gap in said circumferential seal.

21. A method of altering the pressure within an enclosure, as recited in claim 18, wherein a plurality of substantially identical enclosures is provided in step "a", and said enclosures are processed simultaneously in steps "b" through "d".

22. A method of altering the pressure within an enclosure, as recited in claim 18, wherein said first port penetrates said convex blister.

23. A valve comprising an open mode and a closed mode, comprising
   a first layer comprising a concave portion having an upper surface;
   a second layer comprising an invertible portion having a lower surface;
   wherein said lower surface overlays said upper surface;
   a circumferential seal bonding said invertible portion to said concave portion;
   a first port allowing fluid communication through or past said invertible portion;
   a second port allowing fluid communication through said concave portion;
   an adhesive coating covering at least a portion of said upper surface and/or said lower surface;
   wherein the open mode said invertible portion is convex;
   wherein the open mode said first port is in fluid communication with said second port;
   wherein the closed mode said invertible portion is concave;
   wherein the closed mode said second port is blocked by said invertible portion; and
   wherein the closed mode said lower surface proximate to said second port is adhesively sealed against said upper surface.

24. A valve comprising an open mode and a closed mode, as recited in claim 23, wherein said first port penetrates said invertible portion.

25. A valve comprising an open mode and a closed mode, as recited in claim 23, wherein said first port comprises a gap in said circumferential seal.

* * * * *